Dec. 25, 1934.  I. H. JUDD  1,985,414
VEHICLE SPRING ASSEMBLY
Filed Nov. 21, 1932  2 Sheets-Sheet 1
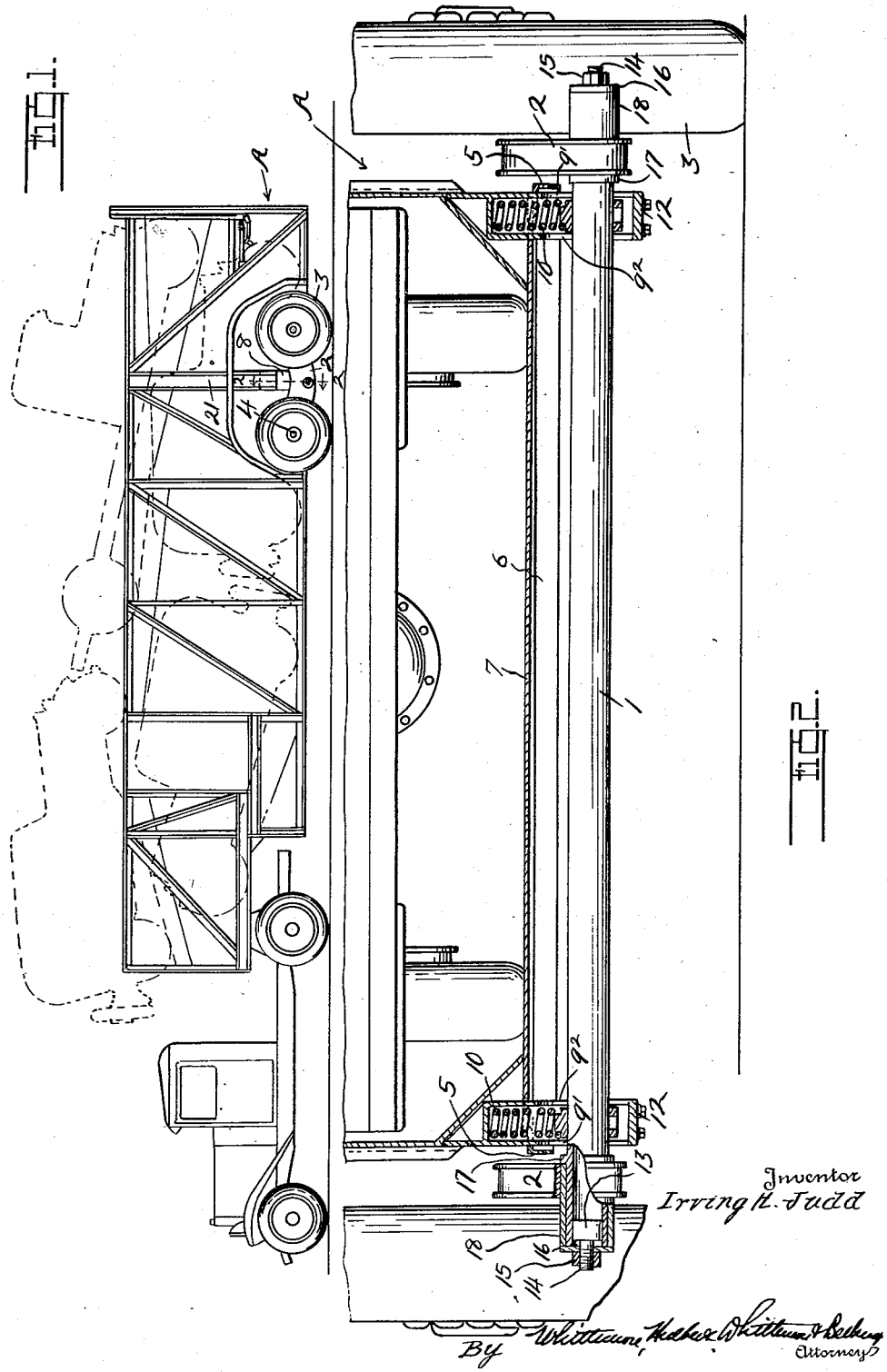

Dec. 25, 1934.　　　　I. H. JUDD　　　　1,985,414
VEHICLE SPRING ASSEMBLY
Filed Nov. 21, 1932　　　2 Sheets-Sheet 2
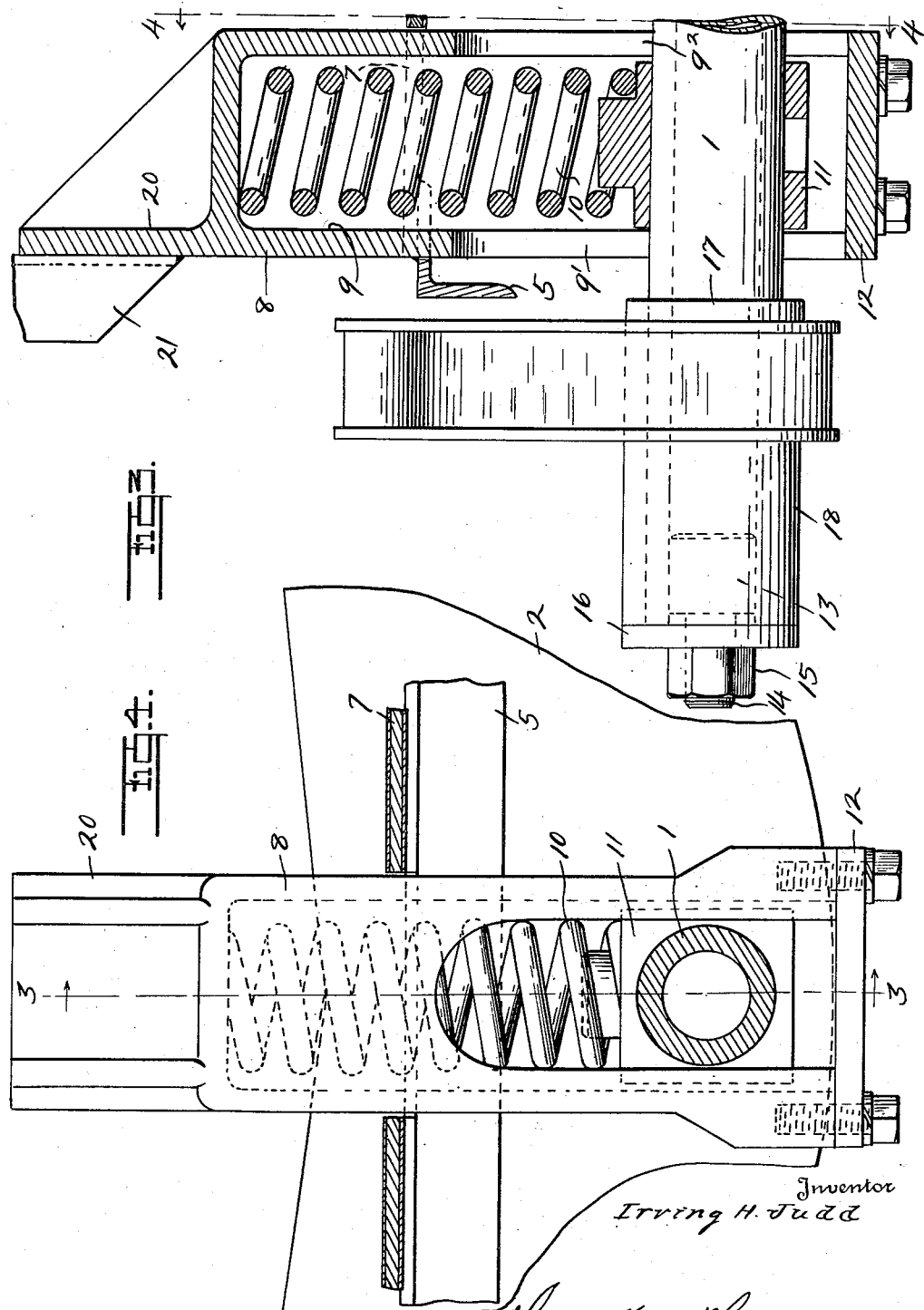
Inventor
Irving H. Judd Patented Dec. 25, 1934

1,985,414

UNITED STATES PATENT OFFICE 1,985,414

VEHICLE SPRING ASSEMBLY

Irving H. Judd, Detroit, Mich., assignor to Whitehead & Kales Company, River Rouge, Mich., a corporation of Michigan Application November 21, 1932, Serial No. 643,781

12 Claims. (Cl. 280—106.5)

This invention relates generally to tandem wheel assemblies and constitutes a continuation in part of my application Serial No. 604,579, filed April 11, 1932.

One of the essential objects of the present invention is to provide a spring assembly wherein yieldable means are provided upon a tandem wheel axle for cushioning a chassis frame.

Another object is to provide an assembly of the type mentioned wherein the cushioning means and walking beams of the tandem wheel structure are so arranged with respect to the chassis frame and axle that sufficient space is provided upon the chassis frame between the upright side frames of the vehicle to receive an automobile while maintaining an over-all statutory width of eight feet.

Another object is to provide a spring assembly wherein the cushioning means for the chassis frame is disposed between the tandem wheel axle and an upright frame member of the vehicle.

Another object is to provide a spring assembly wherein the abutments for the yieldable cushioning means cooperate with the axle and chassis frame to hold the axle and walking beams thereon against displacement longitudinally of the chassis frame.

Another object is to provide a spring assembly wherein certain of the abutments for the yieldable cushioning means serve as housings for said yieldable means.

Other objects, advantages and novel details of construction of this invention will be made more apparent as this description proceeds, especially when considered in connection with the accompanying drawings, wherein:

Figure 1 is a side elevation of a vehicle having a spring assembly embodying my invention;

Figure 2 is a transverse sectional view taken on the line 2—2 of Figure 1;

Figure 3 is a fragmentary vertical sectional view through the spring assembly taken on the line 3—3 of Figure 4;

Figure 4 is a sectional view taken on the line 4—4 of Figure 3.

Referring now to the drawings, A is a suitable vehicle wherein 1 is an axle; 2 are walking beams pivotally mounted upon the axle at opposite ends thereof and preferably corresponding to those set forth in my application, Serial No. 603,191, filed April 4, 1932; and 3 are ground engaging wheels arranged in tandem and rotatably mounted on spindles 4 projecting laterally from the outer sides of said beams 2 at opposite ends thereof. 5 is a chassis frame above the axle between the beams having longitudinally extending sills 5', crossbars 6 extending between and terminally secured to said sills, and 7 is flooring upon the chassis frame and secured to said sills 5' and crossbars 6. 8 are upright castings having downwardly opening socket portions 9 secured to and extending above and below the sills 5' and having aligned vertically extending slots 9' and 9²; 10 are springs within said socket portions 9 above the axle; 11 are blocks on the axles in the socket portions and constituting seats for the springs, and 12 are closures for the lower ends of said sockets. As shown, the axle 1 is tubular in form and has opposite ends thereof closed by the heads 13 of bolts 14 that project therefrom and constitute extensions thereof. Nuts 15 threadedly engage the bolts 14 while plates 16 are sleeved upon the bolts between the nuts 15 and the outer ends of the axle and cooperate with the shoulders 17 of the axle to retain the hubs 18 of the walking beams in proper position longitudinally of the axle.

Thus with this construction the springs 10 will normally hold the axle 1 adjacent the lower ends of the sockets 9 but are yieldable depending upon load and road conditions to cushion the parts and absorb the shocks. In fact, the construction and arrangement of the parts is such that the axle virtually floats in the slots 9' and 9² and the blocks 11 on the axle 1 are movable vertically within the socket portions 9 of the castings 8. In this connection it will be noted that the blocks 11 cooperate with opposite sides of the socket portions 9 to hold the axle 1 and the walking beams 2 thereon against displacement longitudinally of the chassis frame 5. The springs 10 as well as the castings 8 extend above and below the sills 5', hence the latter are received between the walking beams 2. As a result the vehicle has a lower center of gravity and may be loaded and unloaded with greater ease. For example, if the vehicle is to be loaded with automobiles shorter and lighter weight skids may be used from the ground to the flooring. It will also be noted that the castings 8 which constitute housings for the springs have upstanding portions 20 that serve as attaching means and supports for suitable uprights 21 of the side frames of the vehicle. Thus such castings constitute a part of the framework of the vehicle.

What I claim as my invention is:

1. In a vehicle spring assembly, a chassis frame, spring means for cushioning said chassis frame, an upright side frame member spaced above said chassis frame, and a support for said member including a housing for the spring means aforesaid secured to said chassis frame.

2. In a vehicle spring assembly, a chassis frame, and a vertically extending member secured to said chassis frame, having a portion above the chassis frame fashioned as an attaching portion for an upright side frame member, and having a portion below the chassis frame fashioned to house a cushion member for the chassis frame.

3. In a vehicle spring assembly, a chassis frame, a side frame member spaced above the chassis frame, a cushion member for the sill adjacent the chassis frame, and a vertically extending member secured to the chassis frame, having an upstanding portion above the chassis frame secured to and supporting the frame member, and having a downwardly opening socket portion receiving and housing the cushion member.

4. In a vehicle spring assembly, a chassis frame, an upright frame member above said chassis frame, a transversely extending axle beneath and free of contact with said frame, a spring element for cushioning the frame disposed between the axle and upright frame member, and a connection between said axle and upright frame member including a housing for the spring element secured to the chassis frame.

5. In a vehicle spring assembly, a chassis frame, an upright frame member above said chassis frame, a transversely extending axle beneath and free of contact with said frame, a block on the axle, a spring element on the block, and a housing for the spring element having slots receiving the axle and secured to the chassis frame and upright frame member.

6. In a vehicle spring assembly, a chassis frame, an upright frame member above said chassis frame, a transversely extending axle beneath and free of contact with said frame, a block sleeved upon and rigid with the axle, a coil spring on the block, and a housing for the block and coil spring having slots receiving the axle and secured to the chassis frame and upright frame member.

7. In a vehicle spring assembly, a chassis frame, an upright frame member above said chassis frame, a transversely extending axle beneath and free of contact with said frame, a spring element for cushioning the frame, and a housing for the spring element having slots receiving the axle and secured to the chassis frame and to said upright frame member.

8. In a vehicle spring assembly, a chassis frame, and supporting means for said frame comprising walking beams upon opposite sides of said frame, ground engaging wheels carried by said walking beams at opposite ends thereof, a transversely extending non-rotatable axle beneath said frame and terminally connected to said walking beams intermediate their ends, said axle being below the wheel axes and movable vertically relative to said frame, and spring means for said frame supported on the axle between the axis of the axle and the axes of said wheels.

9. In a vehicle spring assembly, a chassis frame, and supporting means for said frame comprising walking beams upon opposite sides of said frame, ground engaging wheels carried by said walking beams at opposite ends thereof, a transversely extending non-rotatable axle beneath said frame and terminally connected to said walking beams intermediate their ends, said axle being below the wheel axes and movable vertically relative to said frame, and spring cushioning means for the frame supported on the axle beside the walking beams between the axis of the axle and the axes of said wheels.

10. In a vehicle spring assembly, a chassis frame, and supporting means for said frame comprising walking beams upon opposite sides of said frame, ground engaging wheels carried by said walking beams at opposite ends thereof, a transversely extending non-rotatable axle beneath said frame and terminally connected to said walking beams intermediate their ends, said axle being below the wheel axes and movable vertically relative to said frame, and spring cushioning means for the frame supported on the axle between the axis thereof and the axes of said wheels.

11. In a vehicle spring assembly, a chassis frame, and supporting means for said frame comprising walking beams upon opposite sides of said frame, ground engaging wheels carried by said walking beams at opposite ends thereof, a transversely extending non-rotatable axle beneath said frame and terminally connected to said walking beams intermediate their ends, said axle being below the wheel axes and movable vertically relative to said frame, and spring cushioning means for the frame connected to the axle and extending upwardly between the axis of the axle and the axes of said wheels.

12. In a vehicle spring assembly, a chassis frame, and supporting means for said frame comprising walking beams upon opposite sides of said frame, ground engaging wheels carried by said walking beams at opposite ends thereof, a transversely extending non-rotatable axle beneath said frame and terminally conected to said walking beams intermediate their ends, said axle being below the wheel axes and movable vertically relative to said frame, and spring cushioning means for the frame connected to the axle beside the walking beams, and having portions between the axis of the axle and the axes of said wheels.

IRVING H. JUDD.